(12) United States Patent
Shin et al.

(10) Patent No.: US 11,855,287 B2
(45) Date of Patent: Dec. 26, 2023

(54) METHOD OF PREPARING POSITIVE ELECTRODE ACTIVE MATERIAL PRECURSOR FOR LITHIUM SECONDARY BATTERY

(71) Applicant: LG Chem, Ltd., Seoul (KR)

(72) Inventors: Ho Suk Shin, Daejeon (KR); Won Tae Kim, Daejeon (KR); Jong Yeol Yu, Daejeon (KR); Young Geun Lim, Daejeon (KR); Sun Sik Shin, Daejeon (KR); Seoung Chul Ha, Daejeon (KR)

(73) Assignee: LG Chem, Ltd.

( * ) Notice: Subject to any disclaimer, the term of this patent is extended or adjusted under 35 U.S.C. 154(b) by 115 days.

(21) Appl. No.: 17/606,876

(22) PCT Filed: Sep. 29, 2020

(86) PCT No.: PCT/KR2020/013421
§ 371 (c)(1),
(2) Date: Oct. 27, 2021

(87) PCT Pub. No.: WO2021/066576
PCT Pub. Date: Apr. 8, 2021

(65) Prior Publication Data
US 2022/0209232 A1     Jun. 30, 2022

(30) Foreign Application Priority Data

Oct. 2, 2019  (KR) .................. 10-2019-0122544

(51) Int. Cl.
*H01M 4/525* (2010.01)
*C01G 53/00* (2006.01)
(Continued)

(52) U.S. Cl.
CPC ............ *H01M 4/525* (2013.01); *C01G 53/44* (2013.01); *H01M 4/0471* (2013.01);
(Continued)

(58) Field of Classification Search
CPC .. H01M 4/525; H01M 4/0471; H01M 4/0497; H01M 4/505; H01M 10/0525;
(Continued)

(56) References Cited

U.S. PATENT DOCUMENTS

2006/0182667 A1   8/2006  Zech et al.
2014/0205901 A1   7/2014  Nagai et al.
(Continued)

FOREIGN PATENT DOCUMENTS

CN     1712356 A      12/2005
CN     102403500 A     4/2012
(Continued)

OTHER PUBLICATIONS

International Search Report for Application No. PCT/KR2020/013421, dated Jan. 12, 2021, 3 pages.
(Continued)

*Primary Examiner* — Andrew J. Oyer
(74) *Attorney, Agent, or Firm* — Lerner David LLP

(57) ABSTRACT

The present invention relates to a method of preparing a positive electrode active material precursor for a lithium secondary battery in which particle size uniformity and productivity may be improved by using three reactors, a method of preparing a positive electrode active material for a lithium secondary battery by using the above-prepared positive electrode active material precursor for a lithium secondary battery, and a positive electrode for a lithium secondary battery and a lithium secondary battery which include the above-prepared positive electrode active material for a lithium secondary battery.

13 Claims, 1 Drawing Sheet

(51) Int. Cl.
*H01M 4/04* (2006.01)
*H01M 4/505* (2010.01)
*H01M 10/0525* (2010.01)
*H01M 4/02* (2006.01)

(52) U.S. Cl.
CPC ......... *H01M 4/0497* (2013.01); *H01M 4/505* (2013.01); *H01M 10/0525* (2013.01); *C01P 2004/61* (2013.01); *C01P 2006/40* (2013.01); *H01M 2004/021* (2013.01); *H01M 2004/028* (2013.01)

(58) Field of Classification Search
CPC ..... H01M 2004/021; H01M 2004/028; H01M 10/052; C01G 53/44; C01G 53/006; C01P 2004/61; C01P 2006/40; C01P 2004/51; Y02E 60/10; B01J 2219/0059
See application file for complete search history.

(56) References Cited

U.S. PATENT DOCUMENTS

| | | |
|---|---|---|
| 2015/0364759 A1 | 12/2015 | Kase et al. |
| 2015/0364761 A1 | 12/2015 | Fukui et al. |
| 2017/0025679 A1 | 1/2017 | Kase et al. |
| 2018/0159128 A1 | 6/2018 | Kim et al. |
| 2018/0294477 A1 | 10/2018 | Shin et al. |
| 2019/0214628 A1* | 7/2019 | Choi .................. C01G 53/006 |
| 2019/0263666 A1 | 8/2019 | Filtvedt |
| 2019/0379044 A1 | 12/2019 | Yun et al. |
| 2019/0386298 A1 | 12/2019 | Yun et al. |
| 2021/0020936 A1 | 1/2021 | Kim et al. |

FOREIGN PATENT DOCUMENTS

| | | |
|---|---|---|
| CN | 102698773 A | 10/2012 |
| CN | 104466162 A | 3/2015 |
| CN | 106920960 A | 7/2017 |
| CN | 109311696 A | 2/2019 |
| CN | 109843810 A | 6/2019 |
| CN | 106920960 B | 9/2019 |
| EP | 3331066 A1 | 6/2018 |
| EP | 3550643 A1 | 10/2019 |
| JP | H07165428 A | 6/1995 |
| JP | 2010192424 A | 9/2010 |
| JP | 5316726 B2 | 10/2013 |
| JP | 5464348 B2 | 4/2014 |
| JP | 2014-144894 A | 8/2014 |
| JP | 2018022568 A | 2/2018 |
| JP | 2018-085198 A | 5/2018 |
| KR | 20140053378 A | 5/2014 |
| KR | 20140107749 A | 9/2014 |
| KR | 101526882 B1 | 6/2015 |
| KR | 20150115831 A | 10/2015 |
| KR | 101748999 B1 | 6/2017 |
| KR | 20170063396 A | 6/2017 |
| WO | 2016204563 A1 | 12/2016 |
| WO | 2018-015210 A1 | 1/2018 |
| WO | 2018-101809 A1 | 6/2018 |
| WO | 2018101807 A1 | 6/2018 |

OTHER PUBLICATIONS

Extended European Search Report including Written Opinion for Application No. 20870821.4 dated Jun. 7, 2022, pp. 1-7.

* cited by examiner

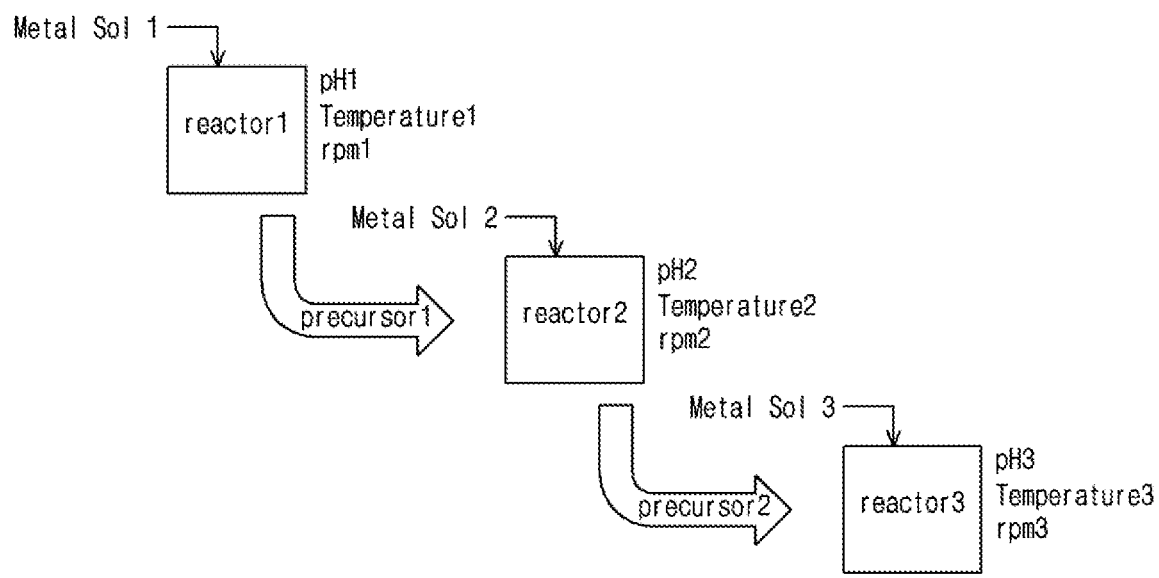

METHOD OF PREPARING POSITIVE ELECTRODE ACTIVE MATERIAL PRECURSOR FOR LITHIUM SECONDARY BATTERY

CROSS-REFERENCE TO RELATED APPLICATIONS

This application is a national phase entry under 35 U.S.C. § 371 of International Application No. PCT/KR2020/013421, filed Sep. 29, 2020, which claims the benefit of priority to Korean Patent Application No. 10-2019-0122544 filed on Oct. 2, 2019, the disclosure of which is hereby incorporated by reference herein its entirety.

TECHNICAL FIELD

The present invention relates to a method of preparing a positive electrode active material precursor for a lithium secondary battery, a method of preparing a positive electrode active material for a lithium secondary battery by using the above-prepared positive electrode active material precursor for a lithium secondary battery, and a positive electrode for a lithium secondary battery and a lithium secondary battery which include the above-prepared positive electrode active material for a lithium secondary battery.

BACKGROUND ART

Demand for secondary batteries as an energy source has been significantly increased as technology development and demand with respect to mobile devices have increased. Among these secondary batteries, lithium secondary batteries having high energy density, high voltage, long cycle life, and low self-discharging rate have been commercialized and widely used.

Lithium transition metal composite oxides have been used as a positive electrode active material of the lithium secondary battery, and, among these oxides, a lithium cobalt composite metal oxide, such as $LiCoO_2$, having a high operating voltage and excellent capacity characteristics has been mainly used. However, since the $LiCoO_2$ has very poor thermal properties due to an unstable crystal structure caused by lithium deintercalation and is expensive, there is a limitation in using a large amount of the $LiCoO_2$ as a power source for applications such as electric vehicles.

Lithium manganese composite metal oxides ($LiMnO_2$ or $LiMn_2O_4$), lithium iron phosphate compounds ($LiFePO_4$, etc.), or lithium nickel composite metal oxides ($LiNiO_2$, etc.) have been developed as materials for replacing the $LiCoO_2$. Among these materials, research and development of the lithium nickel composite metal oxides, in which a large capacity battery may be easily achieved due to a high reversible capacity of about 200 mAh/g, have been more actively conducted. However, the $LiNiO_2$ has limitations in that the $LiNiO_2$ has poorer thermal stability than the $LiCoO_2$ and, when an internal short circuit occurs in a charged state due to an external pressure, the positive electrode active material itself is decomposed to cause rupture and ignition of the battery. Accordingly, as a method to improve low thermal stability while maintaining the excellent reversible capacity of the $LiNiO_2$, a lithium nickel cobalt metal oxide, in which a portion of nickel (Ni) is substituted with cobalt (Co) and a metallic element M (where, M is at least one of manganese (Mn) or aluminum (Al)), has been developed.

Typically, a method of preparing the positive electrode active material includes a method of preparing a positive electrode active material precursor by using a continuous stirred tank reactor (CSTR) and a method of preparing a positive electrode active material precursor by using a batch-type reactor. The continuous stirred tank reactor (CSTR) discharges a precursor composed of particles simultaneously while raw materials are added and co-precipitated, and, with respect to the batch-type reactor, raw materials are added according to a volume of the reactor and reacted for a predetermined time, and a precursor is discharged after the completion of the reaction.

In general, the continuous stirred tank reactor (CSTR) method is advantageous in that the control of a metal composition ratio is easy, but, since the addition of the raw materials and the discharge of the product continuously occur at the same time, variations in residence time and reaction time of the positive electrode active material precursors formed in the reactor may be present, and, accordingly, there is a limitation in that non-uniformity in size and composition of the particles formed occurs.

Thus, there is a tendency to adopt the batch-type method which may easily control a particle size and may prepare a positive electrode active material precursor having a uniform particle size, but there is a difficulty in preparing a positive electrode active material precursor having a uniform particle size distribution even if the batch-type reactor is used, and there is a limitation in that productivity is significantly reduced in comparison to that of the continuous stirred tank reactor (CSTR) method.

Therefore, there is a need to develop a method of preparing a positive electrode active material precursor in which particle size uniformity is not only excellent, but productivity is also excellent.

PRIOR ART DOCUMENT (Patent Document 1) Japanese Patent Application Laid-open Publication No. 1995-0165428

DISCLOSURE OF THE INVENTION

Technical Problem

An aspect of the present invention provides a method of preparing a positive electrode active material precursor for a lithium secondary battery in which a particle size distribution may not only be uniform, but productivity may also be significantly increased through a multi-stage co-precipitation method using a plurality of reactors.

Another aspect of the present invention provides a method of preparing a positive electrode active material for a lithium secondary battery which includes the positive electrode active material precursor.

Another aspect of the present invention provides a positive electrode for a lithium secondary battery which includes a positive electrode active material prepared by the method of preparing a positive electrode active material.

Another aspect of the present invention provides a lithium secondary battery including the positive electrode.

Technical Solution

According to an aspect of the present invention, there is provided a method of preparing a positive electrode active material precursor for a lithium secondary battery which includes: a first step of forming a reaction solution by adding a transition metal-containing solution containing at least one selected from nickel, cobalt, and manganese, an ammonium ion-containing solution, and a basic aqueous solution to a first reactor and performing a co-precipitation reaction under a first pH condition to form transition metal hydroxide seeds; a second step of performing a co-precipitation reaction under a second pH condition while transferring the reaction solution of the first reactor to a second reactor to grow the transition metal hydroxide seeds; a third step of performing a co-precipitation reaction under a third pH condition while transferring a reaction solution of the second reactor to a third reactor to grow transition metal hydroxide particles; and a fourth step of recovering the transition metal hydroxide particles from the third reactor, wherein reaction conditions of the first reactor, the second reactor, and the third reactor satisfy Equation 1 and Equation 2.

Equation 1: first pH> second pH> third Ph

Equation 2: 4≤ temperature of the reaction solution/pH of the reaction solution≤ 6

According to another aspect of the present invention, there is provided a method of preparing a positive electrode active material for a lithium secondary battery which includes: sintering after mixing the positive electrode active material precursor prepared by the above-described method of preparing a positive electrode active material precursor with a lithium-containing raw material.

According to another aspect of the present invention, there is provided a positive electrode for a lithium secondary battery which includes the positive electrode active material prepared by the method of preparing a positive electrode active material for a lithium secondary battery.

According to another aspect of the present invention, there is provided a lithium secondary battery including the positive electrode for a lithium secondary battery.

Advantageous Effects

According to the present invention, a positive electrode active material precursor for a secondary battery may be prepared in which particle shape and size control is easier than when a conventional batch-type single reactor is used and its particle size is uniform.

Also, in a case in which three reactors are used as in the present invention, sizes of the reactors may be adjusted according to a precursor preparation step. Thus, an amount of the precursor produced may be significantly increased by adjusting a raw material addition amount and the size of the reactor according to each preparation step. For example, productivity may be significantly increased by using a large-capacity reactor as the reactor, in which a particle growth step with a long reaction time is performed, and by increasing an amount of transition metal solution added.

BRIEF DESCRIPTION OF THE DRAWINGS

The following drawings attached to the specification illustrate preferred examples of the present invention by example, and serve to enable technical concepts of the present invention to be further understood together with detailed description of the invention given below, and therefore the present invention should not be interpreted only with matters in such drawings.

FIGURE is a view for explaining a method of preparing a positive electrode active material precursor according to the present invention.

MODE FOR CARRYING OUT THE INVENTION

Hereinafter, the present invention will be described in more detail.

It will be understood that words or terms used in the specification and claims shall not be interpreted as the meaning defined in commonly used dictionaries, and it will be further understood that the words or terms should be interpreted as having a meaning that is consistent with their meaning in the context of the relevant art and the technical idea of the invention, based on the principle that an inventor may properly define the meaning of the words or terms to best explain the invention.

The expression "average particle diameter $(D_{50})$" in the present specification may be defined as a particle diameter at a cumulative volume of 50% in a particle size distribution curve. The average particle diameter $(D_{50})$, for example, may be measured by using a laser diffraction method. The laser diffraction method may generally measure a particle diameter ranging from a submicron level to a few mm and may obtain highly repeatable and high-resolution results.

Method of Preparing Positive Electrode Active Material Precursor

The present inventors have found that positive electrode active material precursor particles having a uniform particle size may be prepared by using a plurality of batch-type reactors during the preparation of the positive electrode active material precursor and controlling pH and temperature of each reactor under specific conditions, thereby leading to the completion of the present invention.

Specifically, a method of preparing a positive electrode active material precursor for a lithium secondary battery of the present invention includes: a first step of forming a reaction solution by adding a transition metal-containing solution containing at least one selected from nickel, cobalt, and manganese, an ammonium ion-containing solution, and a basic aqueous solution to a first reactor and performing a co-precipitation reaction under a first pH condition to form transition metal hydroxide seeds; a second step of performing a co-precipitation reaction under a second pH condition while transferring the reaction solution of the first reactor to a second reactor to grow the transition metal hydroxide seeds; a third step of performing a co-precipitation reaction under a third pH condition while transferring a reaction solution of the second reactor to a third reactor to grow transition metal hydroxide particles; and a fourth step of recovering the transition metal hydroxide particles from the third reactor, wherein reaction conditions of the first reactor, the second reactor, and the third reactor satisfy Equation 1 and Equation 2 below.

Equation 1: first pH> second pH≥ third pH

Equation 2: 4≤ temperature of the reaction solution/pH of the reaction solution≤ 6

In a case in which a co-precipitation reaction is performed while transferring the reaction solution according to a precursor particle formation step using three reactors as in the present invention, productivity may not only be improved by increasing an amount of raw material added, but the co-precipitation reaction may also be performed under optimum conditions according to each reaction step because a pH condition and/or a temperature condition in each reactor may be individually controlled.

Also, according to the research of the present inventors, in a case in which a pH in each reactor is adjusted so that the pH is gradually decreased in a precursor particle formation process as in Equation 1 and a ratio of the temperature of the reaction solution to the pH of the reaction solution satisfies specific conditions in Equation 2, precursor particle size uniformity is significantly increased.

Hereinafter, the method of preparing a positive electrode active material precursor according to the present invention will be described in more detail.

First, a reaction solution is formed by adding a transition metal-containing solution containing at least one selected from nickel, cobalt, and manganese, an ammonium ion-containing solution, and a basic aqueous solution to a first reactor, and a co-precipitation reaction is performed under a first pH condition to form transition metal hydroxide seeds (first step).

The transition metal-containing solution may include cations of at least one transition metal selected from the group consisting of nickel, manganese, and cobalt.

For example, the transition metal-containing solution may include 50 mol % to 95 mol % of nickel, 2.5 mol % to 25 mol % of cobalt, and 2.5 mol % to 25 mol % of manganese, and may preferably include 60 mol % to 90 mol % of nickel, 5 mol % to 20 mol % of cobalt, and 5 mol % to 20 mol % of manganese.

The transition metal-containing solution may include sulfates, sulfides, hydroxides, oxides, or oxyhydroxides of the above transition metals, and these materials are not particularly limited as long as they may be dissolved in water.

For example, the nickel (Ni) may be included as $Ni(OH)_2$, $NiO$, $NiOOH$, $NiCO_3$, $2Ni(OH)_2 \cdot 4H_2O$, $NiSO_4$, or $NiSO_4 \cdot 6H_2O$ in the transition metal-containing solution, and at least one thereof may be used.

Also, the cobalt (Co) may be included as $Co(OH)_2$, $CoOOH$, or $Co(SO_4)_2 \cdot 7H_2O$ in the transition metal-containing solution, and at least one thereof may be used.

Furthermore, the manganese (Mn) may be included as a manganese oxide such as $Mn_2O_3$, $MnO_2$, and $Mn_3O_4$; $MnCO_3$, $MnSO_4$; or an oxyhydroxide in the transition metal-containing solution, and at least one thereof may be used.

Also, the transition metal-containing solution may further include another metallic element (M) in addition to the nickel, manganese, and cobalt. In this case, M may include at least one selected from the group consisting of aluminum (Al), zirconium (Zr), titanium (Ti), tungsten (W), niobium (Nb)), and molybdenum (Mo).

In a case in which the transition metal-containing solution further includes the metal (M), a metallic element (M)-containing raw material may be selectively further added during the preparation of the transition metal-containing solution.

As the metallic element (M)-containing raw material, at least one selected from the group consisting of an acetic acid salt, sulfate, sulfide, hydroxide, oxide, or oxyhydroxide containing the metallic element (M) may be used.

The basic aqueous solution may include at least one selected from the group consisting of NaOH, KOH, $Ca(OH)_2$, and $Na_2CO_3$, and water or a mixture of water and an organic solvent (specifically, alcohol etc.), which may be uniformly mixed with the water, may be used as a solvent. In this case, the basic aqueous solution may have a concentration of 2 M to 6 M, for example, 3 M to 5 M. In a case in which the basic aqueous solution has a concentration of 2 M to 6 M, uniform sized precursor particles may be formed, formation time of the precursor particles is fast, and a yield may also be excellent.

The ammonium ion-containing solution may include at least one selected from the group consisting of $NH_4OH$, $(NH_4)_2SO_4$, $NH_4NO_3$, $NH_4Cl$, $CH_3COONH_4$, and $(NH_4)_2CO_3$. In this case, water or a mixture of water and an organic solvent (specifically, alcohol etc.), which may be uniformly mixed with the water, may be used as a solvent.

A temperature (unit: ° C.) of the reaction solution in the first reactor and a pH of the reaction solution are adjusted to satisfy conditions in Equation 2 below.

Equation 2: 4≤ the temperature of the reaction solution/ the pH of the reaction solution≤ 6

Preferably, the temperature of the reaction solution in the first reactor/the pH of the reaction solution may be in a range of 4.5 to 6.0.

In a case in which the ratio of the temperature of the reaction solution to the pH of the reaction solution is outside the above range, since the co-precipitation reaction is not performed smoothly or a growth reaction occurs more predominantly than a nucleation reaction, the yield of the precursor particles decreases and particle size control is difficult, and thus, a precursor having high particle size uniformity may not be obtained.

Specifically, the pH (hereinafter, referred to as "first pH") of the reaction solution in the first reactor may be in a range of 11 to 13, for example, 11.5 to 12.5. Also, the temperature of the reaction solution in the first reactor may be in a range of 50° C. to 65° C., for example, 55° C. to 65° C.

When the first pH and the temperature of the reaction solution satisfy the above ranges, transition metal hydroxide seeds may be smoothly formed. In a case in which the first pH and the temperature of the reaction solution are outside the above ranges, since the co-precipitation reaction is not performed smoothly or the growth reaction occurs more predominantly than the nucleation reaction, the yield of the precursor particles decreases and the particle size control may be difficult.

Specifically, the basic aqueous solution and the ammonium ion-containing solution are first added to the first reactor to allow the pH in the first reactor to be in a range of 11 to 13, for example, 11.5 to 12.5, and thereafter, seeds of the particles may be formed while adding the transition metal-containing solution into the reactor. In this case, since the pH value in the first reactor is changed according to the formation of the particle seeds by the addition of the transition metal-containing solution, the first pH may be controlled to be maintained at 11 to 13 by continuously adding the basic aqueous solution and the ammonium ion-containing solution together with the addition of the transition metal-containing solution.

When the seeds of the precursor particles are formed in the reaction solution through the above process, a co-precipitation reaction is performed under a second pH condition while transferring the reaction solution including the seeds of the precursor particles to a second reactor to grow the transition metal hydroxide seeds (second step).

In this case, the transfer is performed when the seeds of the precursor particles in the first reactor reach a predetermined size. Specifically, when an average particle diameter (D50) of 50% or more of the transition metal hydroxide seeds formed in the first reactor is 3.0 μm or more, the reaction solution in the first reactor begins to be transferred to the second reactor. If the reaction solution begins to be transferred to the second reactor in a state in which the transition metal hydroxide seed is excessively small, since an amount of the precursor particle seeds formed is reduced, productivity may be reduced.

The transfer of the reaction solution of the first reactor to the second reactor may be performed through a connecting pipe connecting the first reactor and the second reactor and by operating a pump located outside the connecting pipe, but the present invention is not limited thereto.

Subsequently, a pH of a reaction solution of the second reactor is adjusted and a co-precipitation reaction is performed to grow particles of the transition metal hydroxide seeds. In this case, the pH of the reaction solution of the second reactor (hereinafter, referred to as "second pH") is adjusted to be lower than the first pH (i.e., the first pH> the second pH), and a temperature (unit: ° C.) of the reaction solution in the second reactor and the pH of the reaction solution are adjusted to satisfy conditions in Equation 2 below.

Equation 2: 4≤ the temperature of the reaction solution/ the pH of the reaction solution≤ 6

Specifically, the second pH may be in a range of 10 to 12, preferably 10.5 to 12.0, and more preferably 11.0 to 12.0.

Also, the temperature of the reaction solution in the second reactor may be a temperature equal to or lower than the temperature of the reaction solution of the first reactor. For example, the temperature of the reaction solution in the second reactor may be in a range of 45° C. to 60° C., for example, 50° C. to 60° C.

In a case in which the second pH in the second reactor and the temperature of the reaction solution satisfy the above ranges, since precursor particle nucleation and particle growth reactions occur properly, the yield of the precursor particles and the particle size uniformity may be improved. Also, the transition metal hydroxide seeds may be grown to a desired size by controlling the temperature of the reaction solution of the second reactor to be equal to or lower than the temperature of the reaction solution of the first reactor. Apart from the reaction solution transferred from the first reactor, the transition metal-containing solution, the ammonium ion-containing solution, and the basic aqueous solution may be additionally added to the second reactor. In this case, the pH of the reaction solution in the second reactor may be adjusted in the second pH range by adjusting amounts of the transition metal-containing solution, ammonium ion-containing solution, and basic aqueous solution added to the second reactor.

When the transition metal hydroxide seeds grow to a predetermined size in the second reactor through the above-described process, the reaction solution of the second reactor is transferred to a third reactor, and a co-precipitation reaction is performed to grow transition metal hydroxide particles (third step).

In this case, the transfer is performed when the seeds of the precursor particles in the second reactor grow to a predetermined size. Specifically, when an average particle diameter (D50) of the transition metal hydroxide seeds formed in the second reactor is in a range of 3.5 μm to 8 μm, the reaction solution in the second reactor begins to be transferred to the third reactor. If the reaction solution is transferred in a state in which the transition metal hydroxide seed is excessively small, it is difficult to obtain precursor particles having a desired particle diameter.

The transfer of the reaction solution of the second reactor to the third reactor may be performed through a connecting pipe connecting the second reactor and the third reactor and by operating a pump located outside the connecting pipe, but the present invention is not limited thereto.

Subsequently, a pH (hereinafter, referred to as "third pH") of the reaction solution of the third reactor is adjusted and a co-precipitation reaction is performed to grow particles of the transition metal hydroxide seeds.

In this case, the third pH is adjusted to be equal to or lower than the second pH (i.e., the second pH≥ the third pH), and a temperature (unit: ° C.) of the reaction solution in the third reactor and the pH of the reaction solution are adjusted to satisfy conditions in Equation 2 below.

Equation 2: 4≤ the temperature of the reaction solution/ the pH of the reaction solution≤ 6

Specifically, the third pH may be in a range of 10.5 to 11.5, preferably 10.5 to 12.0, and more preferably 11.0 to 12.0. Also, the temperature of the reaction solution in the third reactor may be a temperature equal to or lower than the temperature of the reaction solution of the second reactor. For example, the temperature of the reaction solution in the third reactor may be in a range of 45° C. to 60° C., for example, 50° C. to 60° C. In a case in which the third pH in the third reactor and the temperature of the reaction solution satisfy the above ranges, the precursor particles may be grown to a desired size, and precursor particles having excellent particle size uniformity may be obtained.

Apart from the reaction solution transferred from the second reactor, the transition metal-containing solution, the ammonium ion-containing solution, and the basic aqueous solution may be additionally added to the third reactor. In this case, the pH of the reaction solution in the third reactor may be adjusted in the third pH range by adjusting amounts of the transition metal-containing solution, ammonium ion-containing solution, and basic aqueous solution added to the third reactor.

When the transition metal hydroxide particles grow to a predetermined size in the third reactor through the above-described process, the transition metal hydroxide particles are recovered from the third reactor (step 4).

The recovery of the transition metal hydroxide particles may be performed by a method in which the product is precipitated by stopping stirring of the reaction solution and settling the reaction solution and a supernatant is discharged to the outside to recover the precipitated transition metal hydroxide particles, or the reaction solution after the completion of the reaction is discharged to the outside of the third reactor using a filter.

An average particle diameter ($D_{50}$) of the positive electrode active material precursor recovered from the third reactor may be in a range of 8 μm to 20 μm, for example, 9 μm to 16 μm, and a particle size distribution ($D_{90}$–$D_{10}$)/$D_{50}$ may be in a range of 0.2 to 0.6, for example, 0.3 to 0.5.

According to the present invention, stirring speeds of the reaction solutions of the first reactor, the second reactor, and the third reactor may be different from one another. For example, the reaction solution stirring speeds of the first reactor, the second reactor, and the third reactor may satisfy Equation 4 below.

Equation 4: the first reactor stirring speed≥ the second reactor stirring speed> the third reactor stirring speed As in Equation 4, in a case in which the stirring speed of the first reactor is the fastest and the stirring speed is adjusted to be slower in the subsequent step, particle shape control and particle growth rate control may be maximized, and, accordingly, precursor particles with a uniform particle size distribution may be obtained. Specifically, the stirring speed of the reaction solution in the first reactor may be in a range of about 600 rpm to about 1,600 rpm, the stirring speed of the reaction solution in the second reactor may be in a range of about 500 rpm to about 1,400 rpm, and the stirring speed of the reaction solution in the third reactor may be in a range of about 400 rpm to about 1,000 rpm, but the present invention is not limited thereto.

Also, according to the present invention, amounts of the transition metal-containing solutions in the reaction solutions respectively added to the first reactor, the second reactor, and the third reactor may be different for each reactor. For example, the amounts of the transition metal-containing solutions respectively added to the first reactor, the second reactor, and the third reactor may satisfy Equation 5 below.

Equation 5: the amount of the transition metal-containing solution added to the first reactor≤ the amount of the transition metal-containing solution added to the second reactor< the amount of the transition metal-containing solution added to the third reactor In a case in which the amount of the transition metal-containing solution added is adjusted as illustrated in Equation 5, an effect of promoting the growth of the transition metal hydroxide particles and reducing total reaction time may be obtained.

For example, a weight ratio of the amount of the transition metal-containing solution added to the first reactor:the amount of the transition metal-containing solution added to the second reactor:the amount of the transition metal-containing solution added to the third reactor may be in a range of 80:160:320 to 160:300:800, but the present invention is not limited thereto.

According to the present invention, the first reactor, the second reactor, and the third reactor may have different sizes, respectively. For example, the size of the third reactor may be the largest, and the size of the first reactor may be the smallest. In a case in which a reactor with large capacity is used as the third reactor in which a particle growth step with a long reaction time is performed, since the amount of the transition metal-containing solution added may be increased, particle growth reaction time may be reduced and an amount of the precursor produced may be increased.

Method of Preparing Positive Electrode Active Material

The present invention provides a method of preparing a positive electrode active material for a lithium secondary battery which includes: a step of sintering after mixing the positive electrode active material precursor prepared as described above with a lithium-containing raw material.

As the lithium-containing raw material, for example, lithium carbonate ($Li_2CO_3$) or lithium hydroxide (LiOH) may be used, and the positive electrode active material precursor and the lithium-containing raw material may be mixed so that a molar ratio of transition metal:lithium (Li) is in a range of 1:1.0 to 1:1.10. In a case in which the lithium-containing raw material is mixed in a ratio less than the above range, capacity of the prepared positive electrode active material may be reduced, and, in a case in which the lithium-containing raw material is mixed in a ratio greater than the above range, since particles are sintered during a sintering process, the preparation of the positive electrode active material may be difficult, the capacity may be reduced, and separation of the positive electrode active material particles (inducing positive electrode active material impregnation phenomenon) may occur after the sintering.

The sintering may be performed in a temperature range of 750° C. to 950° C. In a case in which the sintering temperature is less than 750° C., since the raw materials may remain in the particles due to an insufficient reaction, high-temperature stability of the battery may be reduced and structural stability may be reduced due to decreases in volume density and crystallinity. In a case in which the sintering temperature is greater than 950° C., non-uniform growth of the particles may occur, and, since a size of the particles is excessively increased to reduce an amount of the particles per unit area, volume capacity of the battery may be reduced. In consideration of the particle size control, capacity, and stability of the prepared positive electrode active material particles and a reduction in lithium-containing by-products, the sintering temperature may be more preferably in a range of 800° C. to 900° C.

The sintering may be performed for 12 hours to 30 hours. In a case in which the sintering time is less than 12 hours, since the sintering time is too short, it may be difficult to obtain a high crystalline positive electrode active material, and, in a case in which the sintering time is greater than 30 hours, the size of the particles may be excessively increased and production efficiency may be reduced.

Positive Electrode

Also, the present invention provides a positive electrode for a lithium secondary battery which includes the positive electrode active material prepared by the above-described method.

Specifically, the positive electrode includes a positive electrode collector and a positive electrode active material layer which is disposed on at least one surface of the positive electrode collector and includes the above-described positive electrode active material.

The positive electrode collector is not particularly limited as long as it has conductivity without causing adverse chemical changes in the battery, and, for example, stainless steel, aluminum, nickel, titanium, fired carbon, or aluminum or stainless steel that is surface-treated with one of carbon, nickel, titanium, silver, or the like may be used. Also, the positive electrode collector may typically have a thickness of 3 μm to 500 μm, and microscopic irregularities may be formed on the surface of the collector to improve the adhesion of the positive electrode active material. The positive electrode collector, for example, may be used in various shapes such as that of a film, a sheet, a foil, a net, a porous body, a foam body, a non-woven fabric body, and the like.

The positive electrode active material layer may include a conductive agent and a binder in addition to the positive electrode active material.

In this case, the positive electrode active material may be included in an amount of 80 wt % to 99 wt %, for example, 90 wt % to 98 wt % based on a total weight of the positive electrode active material layer. When the positive electrode active material is included in an amount within the above range, excellent capacity characteristics may be obtained.

In this case, the conductive agent is used to provide conductivity to the electrode, wherein any conductive agent may be used without particular limitation as long as it has suitable electron conductivity without causing adverse chemical changes in the battery. Specific examples of the conductive agent may be graphite such as natural graphite or artificial graphite; carbon based materials such as carbon black, acetylene black, Ketjen black, channel black, furnace black, lamp black, thermal black, and carbon fibers; powder or fibers of metal such as copper, nickel, aluminum, and silver; conductive whiskers such as zinc oxide whiskers and potassium titanate whiskers; conductive metal oxides such as titanium oxide; or conductive polymers such as polyphenylene derivatives, and any one thereof or a mixture of two or more thereof may be used. The conductive agent may be typically included in an amount of 1 wt % to 10 wt % based on the total weight of the positive electrode active material layer.

The binder improves the adhesion between the positive electrode active material particles and the adhesion between the positive electrode active material and the current collector. Specific examples of the binder may be polyvinylidene fluoride (PVDF), polyvinylidene fluoride-hexafluoropropylene copolymer (PVDF-co-HFP), polyvinyl alcohol, polyacrylonitrile, carboxymethyl cellulose (CMC), starch, hydroxypropyl cellulose, regenerated cellulose, polyvinylpyrrolidone, tetrafluoroethylene, polyethylene, polypropylene, an ethylene-propylene-diene monomer (EPDM), a sulfonated EPDM, a styrene-butadiene rubber (SBR), a fluorine rubber, or various copolymers thereof, and any one thereof or a mixture of two or more thereof may be used. The binder may be included in an amount of 1 wt % to 10 wt % based on the total weight of the positive electrode active material layer.

The positive electrode may be prepared according to a typical method of preparing a positive electrode except that the above-described positive electrode active material is used. Specifically, a composition for forming a positive electrode active material layer, which is prepared by dissolving or dispersing the positive electrode active material as well as selectively the binder and the conductive agent in a solvent, is coated on the positive electrode collector, and the positive electrode may then be prepared by drying and rolling the coated positive electrode collector. In this case, types and amounts of the positive electrode active material, the binder, and the conductive are the same as those previously described.

The solvent may be a solvent normally used in the art. The solvent may include dimethyl sulfoxide (DMSO), isopropyl alcohol, N-methylpyrrolidone (NMP), acetone, or water, and any one thereof or a mixture of two or more thereof may be used. An amount of the solvent used may be sufficient if the solvent may dissolve or disperse the positive electrode active material, the conductive agent, and the binder in consideration of a coating thickness of a slurry and manufacturing yield, and may allow to have a viscosity that may provide excellent thickness uniformity during the subsequent coating for the preparation of the positive electrode.

Also, as another method, the positive electrode may be prepared by casting the composition for forming a positive electrode active material layer on a separate support and then laminating a film separated from the support on the positive electrode collector.

Lithium Secondary Battery

Furthermore, in the present invention, an electrochemical device including the positive electrode may be prepared. The electrochemical device may specifically be a battery or a capacitor, and, for example, may be a lithium secondary battery.

The lithium secondary battery specifically includes a positive electrode, a negative electrode disposed to face the positive electrode, a separator disposed between the positive electrode and the negative electrode, and an electrolyte, wherein, since the positive electrode is the same as described above, detailed descriptions thereof will be omitted, and the remaining configurations will be only described in detail below.

Also, the lithium secondary battery may further selectively include a battery container accommodating an electrode assembly of the positive electrode, the negative electrode, and the separator, and a sealing member sealing the battery container.

In the lithium secondary battery, the negative electrode includes a negative electrode collector and a negative electrode active material layer disposed on the negative electrode collector.

The negative electrode collector is not particularly limited as long as it has high conductivity without causing adverse chemical changes in the battery, and, for example, copper, stainless steel, aluminum, nickel, titanium, fired carbon, copper or stainless steel that is surface-treated with one of carbon, nickel, titanium, silver, or the like, and an aluminum-cadmium alloy may be used. Also, the negative electrode collector may typically have a thickness of 3 μm to 500 μm, and, similar to the positive electrode collector, microscopic irregularities may be formed on the surface of the collector to improve the adhesion of a negative electrode active material. The negative electrode collector, for example, may be used in various shapes such as that of a film, a sheet, a foil, a net, a porous body, a foam body, a non-woven fabric body, and the like.

The negative electrode active material layer selectively includes a binder and a conductive agent in addition to the negative electrode active material.

A compound capable of reversibly intercalating and deintercalating lithium may be used as the negative electrode active material. Specific examples of the negative electrode active material may be a carbonaceous material such as artificial graphite, natural graphite, graphitized carbon fibers, and amorphous carbon; a metallic compound alloyable with lithium such as silicon (Si), aluminum (Al), tin (Sn), lead (Pb), zinc (Zn), bismuth (Bi), indium (In), magnesium (Mg), gallium (Ga), cadmium (Cd), a Si alloy, a Sn alloy, or an Al alloy; a metal oxide which may be doped and undoped with lithium such as $SiO_\beta$ ($0< \beta< 2$), $SnO_2$, vanadium oxide, and lithium vanadium oxide; or a composite including the metallic compound and the carbonaceous material such as a Si—C composite or a Sn—C composite, and any one thereof or a mixture of two or more thereof may be used. Also, a metallic lithium thin film may be used as the negative electrode active material. Furthermore, both low crystalline carbon and high crystalline carbon may be used as the carbon material. Typical examples of the low crystalline carbon may be soft carbon and hard carbon, and typical examples of the high crystalline carbon may be irregular, planar, flaky, spherical, or fibrous natural graphite or artificial graphite, Kish graphite, pyrolytic carbon, mesophase pitch-based carbon fibers, meso-carbon microbeads, mesophase pitches, and high-temperature sintered carbon such as petroleum or coal tar pitch derived cokes.

The negative electrode active material may be included in an amount of 90 parts by weight to 99 parts by weight based on 100 parts by weight of a total weight of the negative electrode active material layer.

The binder is a component that assists in the binding between the conductive agent, the active material, and the current collector, wherein the binder is typically added in an amount of 0.1 part by weight to 10 parts by weight based on 100 parts by weight of the total weight of the negative electrode active material layer. Examples of the binder may be polyvinylidene fluoride (PVDF), polyvinyl alcohol, carboxymethylcellulose (CMC), starch, hydroxypropylcellulose, regenerated cellulose, polyvinylpyrrolidone, tetrafluoroethylene, polyethylene, polypropylene, an ethylene-propylene-diene polymer (EPDM), a sulfonated-EPDM, a styrene-butadiene rubber, a fluoro rubber, and various copolymers thereof.

The conductive agent is a component for further improving conductivity of the negative electrode active material, wherein the conductive agent may be added in an amount of 10 parts by weight or less, for example, 5 parts by weight or less based on 100 parts by weight of the total weight of the negative electrode active material layer. The conductive agent is not particularly limited as long as it has conductivity without causing adverse chemical changes in the battery, and, for example, a conductive material such as: graphite such as natural graphite or artificial graphite; carbon black such as acetylene black, Ketjen black, channel black, furnace black, lamp black, and thermal black; conductive fibers such as carbon fibers or metal fibers; metal powder such as fluorocarbon powder, aluminum powder, and nickel powder; conductive whiskers such as zinc oxide whiskers and potassium titanate whiskers; conductive metal oxide such as titanium oxide; or polyphenylene derivatives may be used.

For example, the negative electrode active material layer may be prepared by coating a negative electrode material mixture, which is prepared by dissolving or dispersing selectively the binder and the conductive agent as well as the negative electrode active material in a solvent, on the negative electrode collector and drying the coated negative electrode collector, or may be prepared by casting the negative electrode material mixture on a separate support and then laminating a film separated from the support on the negative electrode collector.

In the lithium secondary battery, the separator separates the negative electrode and the positive electrode and provides a movement path of lithium ions, wherein any separator may be used as the separator without particular limitation as long as it is typically used in a lithium secondary battery, and particularly, a separator having high moisture-retention ability for an electrolyte as well as low resistance to the transfer of electrolyte ions may be used. Specifically, a porous polymer film, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, or a laminated structure having two or more layers thereof may be used. Also, a typical porous nonwoven fabric, for example, a nonwoven fabric formed of high melting point glass fibers or polyethylene terephthalate fibers may be used. Furthermore, a coated separator including a ceramic component or a polymer material may be used to secure heat resistance or mechanical strength, and the separator having a single layer or multilayer structure may be selectively used.

Also, the electrolyte used in the present invention may include an organic liquid electrolyte, an inorganic liquid electrolyte, a solid polymer electrolyte, a gel-type polymer electrolyte, a solid inorganic electrolyte, or a molten-type inorganic electrolyte which may be used in the preparation of the lithium secondary battery, but the present invention is not limited thereto.

Specifically, the electrolyte may include an organic solvent and a lithium salt.

Any organic solvent may be used as the organic solvent without particular limitation so long as it may function as a medium through which ions involved in an electrochemical reaction of the battery may move. Specifically, an ester-based solvent such as methyl acetate, ethyl acetate, γ-butyrolactone, and ε-caprolactone; an ether-based solvent such as dibutyl ether or tetrahydrofuran; a ketone-based solvent such as cyclohexanone; an aromatic hydrocarbon-based solvent such as benzene and fluorobenzene; or a carbonate-based solvent such as dimethyl carbonate (DMC), diethyl carbonate (DEC), methylethyl carbonate (MEC), ethylmethyl carbonate (EMC), ethylene carbonate (EC), and propylene carbonate (PC); an alcohol-based solvent such as ethyl alcohol and isopropyl alcohol; nitriles such as R—CN (where R is a linear, branched, or cyclic C2-C20 hydrocarbon group and may include a double-bond aromatic ring or ether bond); amides such as dimethylformamide; dioxolanes such as 1,3-dioxolane; or sulfolanes may be used as the organic solvent. Among these solvents, the carbonate-based solvent may be used, and, for example, a mixture of a cyclic carbonate (e.g., ethylene carbonate or propylene carbonate) having high ionic conductivity and high dielectric constant, which may increase charge/discharge performance of the battery, and a low-viscosity linear carbonate-based compound (e.g., ethylmethyl carbonate, dimethyl carbonate, or diethyl carbonate) may be used. In this case, the performance of the electrolyte solution may be excellent when the cyclic carbonate and the chain carbonate are mixed in a volume ratio of about 1:1 to about 1:9.

The lithium salt may be used without particular limitation as long as it is a compound capable of providing lithium ions used in the lithium secondary battery. Specifically, $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$. LiCl, LiI, or $LiB(C_2O_4)_2$ may be used as the lithium salt. The lithium salt may be used in a concentration range of 0.1 M to 2.0 M. In a case in which the concentration of the lithium salt is included within the above range, since the electrolyte may have appropriate conductivity and viscosity, excellent performance of the electrolyte may be obtained and lithium ions may effectively move.

In order to improve lifetime characteristics of the battery, suppress the reduction in battery capacity, and improve discharge capacity of the battery, at least one additive, for example, a halo-alkylene carbonate-based compound such as difluoroethylene carbonate, pyridine, triethylphosphite, triethanolamine, cyclic ether, ethylenediamine, n-glyme, hexaphosphoric triamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxy ethanol, or aluminum trichloride, may be further added to the electrolyte in addition to the electrolyte components. In this case, the additive may be included in an amount of 0.1 part by weight to 5 parts by weight based on 100 parts by weight of a total weight of the electrolyte.

As described above, since the lithium secondary battery including the positive electrode active material according to the present invention stably exhibits excellent discharge capacity, output characteristics, and capacity retention, the lithium secondary battery is suitable for portable devices, such as mobile phones, notebook computers, and digital cameras, and electric cars such as hybrid electric vehicles (HEVs).

Thus, according to another embodiment of the present invention, a battery module including the lithium secondary battery as a unit cell and a battery pack including the battery module are provided.

The battery module or the battery pack may be used as a power source of at least one medium and large sized device of a power tool; electric cars including an electric vehicle (EV), a hybrid electric vehicle, and a plug-in hybrid electric vehicle (PHEV); or a power storage system.

A shape of the lithium secondary battery of the present invention is not particularly limited, but a cylindrical type using a can, a prismatic type, a pouch type, or a coin type may be used.

The lithium secondary battery according to the present invention may not only be used in a battery cell that is used as a power source of a small device, but may also be used as a unit cell in a medium and large sized battery module including a plurality of battery cells.

Hereinafter, the present invention will be described in detail, according to specific examples. The invention may, however, be embodied in many different forms and should not be construed as being limited to the embodiments set forth herein. Rather, these example embodiments are provided so that this description will be thorough and complete, and will fully convey the scope of the present invention to those skilled in the art.

Example 1

A first reactor having a capacity of 5 L, a second reactor connected to the first reactor, and a third reactor connected to the second reactor were prepared, and an atmosphere in each reactor was adjusted as described below.

First, after 1.5 L of deionized water was put in the batch-type first reactor which was set at 60° C. and had a capacity of 5 L, the reactor was purged with nitrogen gas at a rate of 4 L/min to remove dissolved oxygen in the water and create a non-oxidizing atmosphere in the first reactor, 25 mL to 40 mL of a 15 wt % $NH_4OH$ aqueous solution was added to the first reactor, and a 20 wt % NaOH aqueous solution was added so that a pH in the first reactor became 12.2.

Raw materials were mixed in distilled water in amounts such that a molar ratio of nickel:cobalt:manganese was 7:1:2 to prepare a transition metal-containing solution with a concentration of 2.2 M.

Subsequently, the 15 wt % $NH_4OH$ aqueous solution was added at a rate of 25 mL/hr while adding the above-prepared transition metal-containing solution at a rate of 200 mL/hr to the first reactor. Also, the 20 wt % NaOH aqueous solution was added to the first reactor to adjust the pH of a reaction solution of the first reactor to 12. Then, a reaction was performed while stirring the reaction solution at a stirring speed of 1,600 rpm to form transition metal hydroxide seeds.

The reaction solution in the first reactor was sampled at predetermined time intervals to check an average particle diameter of the transition metal hydroxide particles (seeds) in the reaction solution, and, when the average particle diameter (D50) of 50% or more of the transition metal hydroxide particles (seeds) reached 3.0 µm, the reaction solution in the first reactor was transferred at a rate of 1 L/min to a batch-type second reactor which was set at 55° C. to 60° C. and had a capacity of 10 L.

In order to maintain the same atmosphere as the first reactor, the second reactor was purged with nitrogen gas at a rate of 8 L/min to remove dissolved oxygen in the water and thus, an atmosphere in the second reactor was adjusted to a non-oxidizing atmosphere. Subsequently, the 15 wt % $NH_4OH$ aqueous solution was added at a rate of 44 mL/hr to 55 mL/hr while adding the transition metal-containing solution at a rate of 500 mL/hr to the second reactor. Also, the 20 wt % NaOH aqueous solution was added to the second reactor to adjust the pH of a reaction solution in the second reactor to a range of 11.4 to 12.0.

A reaction was performed while stirring the reaction solution of the second reactor at a stirring speed of 1,000 rpm to 1,200 rpm to grow the precursor particle seeds. In order to adjust a particle shape, the second reactor was set so that the pH gradually decreased over time.

The reaction solution in the second reactor was sampled at predetermined time intervals to check an average particle diameter of the transition metal hydroxide particles (seeds) in the reaction solution, and, when the average particle diameter of the transition metal hydroxide particles (seeds) was 7 µm, the reaction solution in the second reactor was transferred at a rate of 1.5 L/min to a batch-type third reactor which was set at 50° C. to 55° C. and had a capacity of 40 L. In order to maintain the second reactor and the third reactor in the same atmosphere, the third reactor was purged with nitrogen gas at a rate of 16 L/min to remove dissolved oxygen in the water and thus, an atmosphere in the third reactor was adjusted to a non-oxidizing atmosphere.

Subsequently, the 15 wt % $NH_4OH$ aqueous solution was added at a rate of 80 mL/hr to 140 mL/hr while adding the transition metal-containing solution at a rate of 1,000 mL/hr to 1,500 mL/hr to the third reactor. Also, the 20 wt % NaOH aqueous solution was added to the third reactor to adjust the pH of a reaction solution in the third reactor to a range of 10.8 to 11.4.

Then, a reaction was performed while stirring the reaction solution of the third reactor at a stirring speed of 600 rpm to 800 rpm to grow the transition metal hydroxide particles.

The reaction solution in the third reactor was sampled at predetermined time intervals to check an average particle diameter of the transition metal hydroxide particles in the reaction solution, and, when the average particle diameter of the transition metal hydroxide particles reached 9.5 µm, the reaction was terminated, and the transition metal hydroxide particles were recovered to obtain positive electrode active material precursor particles.

Example 2

A positive electrode active material precursor was prepared in the same manner as in Example 1 except that the transition metal-containing solution was added at a rate of 1,500 mL/hr to 2,000 mL/hr to the third reactor, and the 15 wt % $NH_4OH$ aqueous solution was added at a rate of 140 mL/hr to 180 mL/hr.

Example 3

A positive electrode active material precursor was prepared in the same manner as in Example 1 except that the pH in the first reactor was adjusted to 11.8, the pH in the second reactor was adjusted to a range of 11.0 to 11.6, and the pH in the third reactor was adjusted to a range of 10.4 to 11.0 by adjusting the amounts of the NaOH aqueous solutions respectively added to the first reactor, the second reactor, and the third reactor.

Comparative Example 1

A positive electrode active material precursor was prepared in the same manner as in Example 1 except that formation of transition metal hydroxide seeds, growth of the transition metal hydroxide seeds, and growth of transition metal hydroxide particles were all performed in one batch-type reactor having a capacity of 40 L without transferring a reaction solution.

Comparative Example 2

A positive electrode active material precursor was prepared in the same manner as in Example 1 except that the temperatures of the first reactor, the second reactor, and the third reactor were set at 45° C.

Comparative Example 3

A positive electrode active material precursor was prepared in the same manner as in Example 1 except that the temperature of the second reactor was set at 65° C. and the pH was adjusted to 10.8.

Comparative Example 4

A positive electrode active material precursor was prepared in the same manner as in Example 3 except that the pH of the third reactor was adjusted to 11.8.

Comparative Example 5

A positive electrode active material precursor was prepared in the same manner as in Example 1 except that the pH of the first reactor was adjusted to 11.4.

TABLE 1

|  | First reactor | | | Second reactor | | | Third reactor | | |
| --- | --- | --- | --- | --- | --- | --- | --- | --- | --- |
|  | Temp. (° C.) | pH | Temp./pH | Temp. (° C.) | pH | Temp./pH | Temp. (° C.) | pH | Temp./pH |
| Example 1 | 60 | 12 | 5 | 55~60 | 11.4~12.0 | 4.58~5.26 | 50~55 | 10.8~11.4 | 4.38~5.09 |
| Example 2 | 60 | 12 | 5 | 55~60 | 11.4~12.0 | 4.58~5.26 | 50~55 | 10.8~11.4 | 4.38~5.09 |
| Example 3 | 60 | 11.8 | 5.08 | 55~60 | 11.0~11.6 | 4.74~5.45 | 50~55 | 10.4~11.0 | 4.54~5.29 |
| Comparative Example 1 | | | | Reaction was performed in one reactor | | | | | |
| Comparative Example 2 | 45 | 12 | 3.75 | 45 | 11.4~12.0 | 3.75~3.95 | 45 | 10.8~11.4 | 3.94~4.17 |
| Comparative Example 3 | 60 | 12 | 5 | 65 | 10.8 | 6.02 | 50~55 | 10.8~11.4 | 4.38~5.09 |
| Comparative Example 4 | 60 | 11.8 | 5.08 | 55~60 | 11.0~11.6 | 4.74~5.45 | 50~55 | 11.8 | 4.23~4.66 |
| Comparative Example 5 | 60 | 11.4 | 5.26 | 55~60 | 11.4~12.0 | 4.58~5.26 | 50~55 | 10.8~11.4 | 4.38~5.09 |

TABLE 3

|  | Amount of precursor formed (kg) | Yield improvement ratio based on conventional case (Comparative Example 1) (%) |
| --- | --- | --- |
| Example 1 | 24.3 | 100 |
| Example 2 | 32.2 | 133 |
| Example 3 | 24.1 | 100 |
| Comparative Example 1 | 24.2 | 100 |
| Comparative Example 2 | 23.9 | 98.4 |
| Comparative Example 3 | 24 | 99 |
| Comparative Example 4 | 24.2 | 100 |
| Comparative Example 5 | 23.8 | 98 |

Experimental Example 1: Particle Size Distribution Check

In order to check particle size distributions of the positive electrode active material precursor particles prepared in Examples 1 to 3 and Comparative Examples 1 to 5, particle diameters of the positive electrode active material precursors formed in Examples 1 to 3 and Comparative Examples 1 to 5 were measured using a particle size distribution measurement instrument (Microtrac S3500, Microtrac), and the results thereof are presented in Table 2 below.

TABLE 2

|  | $D_{10}$ (μm) | $D_{50}$ (μm) | $D_{90}$ (μm) | $(D_{90} - D_{10})/D_{50}$ |
| --- | --- | --- | --- | --- |
| Example 1 | 7.6 | 9.5 | 11.3 | 0.389 |
| Example 2 | 10.2 | 12.5 | 14.4 | 0.336 |
| Example 3 | 9.1 | 12.2 | 16.8 | 0.631 |
| Comparative Example 1 | 5.2 | 8.8 | 13.2 | 0.909 |
| Comparative Example 2 | 3.7 | 6.5 | 8.6 | 0.754 |
| Comparative Example 3 | 11.3 | 14.2 | 23.1 | 0.831 |
| Comparative Example 4 | 3.9 | 6.2 | 9.5 | 0.903 |
| Comparative Example 5 | 5.4 | 8.7 | 12.7 | 0.839 |

As illustrated in Table 2, it may be confirmed that the positive electrode active material precursor particles prepared in Examples 1 to 3 had better particle size uniformity than Comparative Examples 1 to 5.

Experimental Example 2: Positive Electrode Active Material Precursor Yield Check In order to compare productivities of the positive electrode active material precursors prepared in Examples 1 to 3 and Comparative Examples 1 to 5, amounts of the precursors prepared in Examples 1 to 3 and Comparative Examples 1 to 5 during the same time were measured, and the results thereof are presented in Table 3 below.

As illustrated in Table 3, it may be confirmed that the amount of the positive electrode active material precursor formed during the same time in Example 2 was greater than that of the positive electrode active material precursor prepared in Comparative Example 1. Also, amounts of the positive electrode active material precursor particles prepared in Examples 1 and 3 were similar to those of Comparative Examples 1 and 4, but it may be confirmed that the precursors having a more uniform particle size distribution than Comparative Examples 1 and 4 were obtained as illustrated in Table 2. With respect to Comparative Examples 2, 3, and 5, amounts of the precursors formed were slightly reduced in comparison to that of Comparative Example 1.

The invention claimed is:

1. A method of preparing a positive electrode active material precursor for a lithium secondary battery, comprising:
   a first step of forming a reaction solution by adding a transition metal-containing solution containing at least one selected from nickel, cobalt, and manganese, an ammonium ion-containing solution, and a basic aqueous solution to a first reactor and performing a co-precipitation reaction under a first pH condition to form transition metal hydroxide seeds;
   a second step of performing a co-precipitation reaction under a second pH condition while transferring the reaction solution of the first reactor to a second reactor to grow the transition metal hydroxide seeds;

a third step of performing a co-precipitation reaction under a third pH condition while transferring a reaction solution of the second reactor to a third reactor to grow transition metal hydroxide particles; and a fourth step of recovering the transition metal hydroxide particles from the third reactor, wherein reaction conditions of the first reactor, the second reactor, and the third reactor satisfy Equation 1 and Equation 2

Equation 1: first pH>second pH≥third pH

Equation 2: 4≤temperature of the reaction solution (° C.)/pH of the reaction solution ≤6.

2. The method of claim 1, wherein the first pH condition comprises a pH of 11 to 13.

3. The method of claim 1, wherein the second pH condition comprises a pH of 10 to 12.

4. The method of claim 1, wherein the third pH condition comprises a pH of 10.5 to 11.5.

5. The method of claim 1, wherein the reaction solution is transferred to the second reactor when an average particle diameter (D50) of 50% or more of the transition metal hydroxide seeds formed in the first reactor is 3.0 μm or more.

6. The method of claim 1, wherein the reaction solution is transferred to the third reactor when an average particle diameter (D50) of the transition metal hydroxide seeds in the second reactor is in a range of 3.5 μm to 8 μm.

7. The method of claim 1, wherein an average particle diameter (D50) of the positive electrode active material precursor particles recovered from the third reactor is in a range of 9 μm to 15 μm.

8. The method of claim 1, wherein reaction temperatures of the first reactor, the second reactor, and the third reactor satisfy Equation 3

Equation 3: the first reactor reaction temperature≥the second reactor reaction temperature≥the third reactor reaction temperature.

9. The method of claim 1, wherein reaction solution stirring speeds of the first reactor, the second reactor, and the third reactor satisfy Equation 4

Equation 4: the first reactor stirring speed≥the second reactor stirring speed>the third reactor stirring speed.

10. The method of claim 1, wherein, in the second step and the third step, the transition metal-containing solution, the ammonium ion-containing solution, and the basic aqueous solution are additionally added to the second reactor and the third reactor.

11. The method of claim 10, wherein amounts of the transition metal-containing solutions respectively added to the first reactor, the second reactor, and the third reactor satisfy Equation 5

Equation 5: the amount of the transition metal-containing solution added to the first reactor≤the amount of the transition metal-containing solution added to the second reactor<the amount of the transition metal-containing solution added to the third reactor.

12. The method of claim 1, wherein sizes of the first reactor, the second reactor, and the third reactor are different from one another.

13. A method of preparing a positive electrode active material for a lithium secondary battery, comprising:

sintering after mixing the positive electrode active material precursor prepared by the method of claim 1 with a lithium-containing raw material.

* * * * *